(12) United States Patent
Magner et al.

(10) Patent No.: US 10,385,594 B2
(45) Date of Patent: Aug. 20, 2019

(54) POWER LOCKING DOOR HANDLE WITH CAPACITIVE SENSING

(71) Applicant: TriMark Corporation, New Hampton, IA (US)

(72) Inventors: David S. Magner, Decorah, IA (US); Anita L. Reichling, Boscobel, WI (US); Nicolas L. Kloxin, New Hampton, IA (US); Todd Keaffaber, Hillsboro, OR (US); Santosh Balakrishnan, Portland, OR (US)

(73) Assignee: TriMark Corporation, New Hampton, IA (US)

( * ) Notice: Subject to any disclaimer, the term of this patent is extended or adjusted under 35 U.S.C. 154(b) by 263 days.

(21) Appl. No.: 15/450,997

(22) Filed: Mar. 6, 2017

(65) Prior Publication Data
US 2018/0252005 A1  Sep. 6, 2018

(51) Int. Cl.
*E05B 85/16* (2014.01)
*E05B 85/06* (2014.01)
(Continued)

(52) U.S. Cl.
CPC .......... *E05B 81/77* (2013.01); *B60R 16/0207* (2013.01); *E05B 1/0038* (2013.01); *E05B 47/0657* (2013.01); *E05B 81/06* (2013.01); *E05B 81/64* (2013.01); *E05B 81/78* (2013.01); *E05B 85/06* (2013.01); *E05B 85/10* (2013.01); *E05B 85/16* (2013.01); *G07C 9/00182* (2013.01); *G07C 2009/0019* (2013.01)

(58) Field of Classification Search
CPC ...... E05B 85/16; E05B 81/76; E05B 47/0012; E05B 49/00; E05B 2047/0058; E05B 2047/002; Y10T 70/70; Y10T 70/7068; Y10T 70/7486

USPC ......... 70/207–210, 213, 214, 224, 256, 257, 70/278.1, 279.1, DIG. 37; 340/5.54, 5.72; 362/501
See application file for complete search history.

(56) References Cited

U.S. PATENT DOCUMENTS

D506,377 S    6/2005  Marzolf et al.
6,998,968 B2  2/2006  Gamault et al.
(Continued)

FOREIGN PATENT DOCUMENTS

EP    1319777 A1    6/2003

OTHER PUBLICATIONS

US 8,919,831 B2, 12/2014, Tateishi et al. (withdrawn)
Trimark Corporation, "020-0850 e-Locking Pull Handle" brochure, 3 pages. Jun. 2016.

*Primary Examiner* — Suzanne L Barrett
(74) *Attorney, Agent, or Firm* — McKee, Voorhees & Sease, PLC

(57) ABSTRACT

A power locking door handle with capacitive sensing is provided for heavy duty vehicles. The door handle includes a base surface mounted to the exterior of the vehicle door and a hand grip mounted or formed with the base. The handle may be a pull type or push button type. A power lock motor and printed circuit board with a capacitive sensor are sealed within the base. When an operator's hand is inserted between the hand grip and the base, the capacitive sensor sends a signal via the PCB to the motor to unlock the door latch. A key lock cylinder on the base overrides the lock motor if power to the motor is disabled.

18 Claims, 6 Drawing Sheets

(51) Int. Cl.
*E05B 81/64* (2014.01)
*B60R 16/02* (2006.01)
*G07C 9/00* (2006.01)
*E05B 47/06* (2006.01)
*E05B 81/06* (2014.01)
*E05B 81/78* (2014.01)
*E05B 85/10* (2014.01)
*E05B 1/00* (2006.01)

(56) References Cited

U.S. PATENT DOCUMENTS

| | | | |
|---|---|---|---|
| 7,018,214 B2 | 3/2006 | Fukunaga et al. | |
| 7,040,125 B2 * | 5/2006 | Ciezki | E05B 1/0092 |
| | | | 292/336.3 |
| 7,089,770 B2 * | 8/2006 | Ramsauer | E05B 17/22 |
| | | | 292/DIG. 31 |
| 7,192,285 B2 | 3/2007 | Makino et al. | |
| 7,217,899 B2 | 5/2007 | Klidaka et al. | |
| 7,375,299 B1 | 5/2008 | Pudney | |
| 7,576,631 B1 * | 8/2009 | Bingle | E05B 81/76 |
| | | | 340/5.54 |
| 7,654,147 B2 | 2/2010 | Witte et al. | |
| 7,819,440 B2 | 10/2010 | Schwickerath | |
| 7,931,314 B2 | 4/2011 | Nitawaki et al. | |
| 8,403,384 B2 | 3/2013 | Ieda et al. | |
| 8,636,309 B2 | 1/2014 | Mueller et al. | |
| D708,924 S | 7/2014 | Kraus et al. | |
| 9,033,379 B2 * | 5/2015 | Tateishi | E05B 85/16 |
| | | | 292/336.3 |
| 9,353,557 B2 | 5/2016 | Sanborn et al. | |
| 9,441,403 B2 | 9/2016 | Kraus et al. | |
| 9,447,604 B2 | 9/2016 | Witte et al. | |
| 2003/0031025 A1 * | 2/2003 | Huizenga | B60Q 1/2669 |
| | | | 362/501 |
| 2008/0178646 A1 | 7/2008 | Schwickerath | |
| 2010/0007463 A1 * | 1/2010 | Dingman | B60Q 1/2669 |
| | | | 340/5.72 |
| 2010/0219935 A1 * | 9/2010 | Bingle | E05B 81/76 |
| | | | 340/5.54 |
| 2011/0148575 A1 * | 6/2011 | Sobecki | E05B 85/103 |
| | | | 340/5.64 |
| 2014/0000165 A1 | 1/2014 | Patel et al. | |
| 2014/0246873 A1 | 9/2014 | Raulin et al. | |
| 2014/0338409 A1 | 11/2014 | Kraus et al. | |
| 2014/0347163 A1 * | 11/2014 | Banter | B60R 25/01 |
| | | | 340/5.72 |

* cited by examiner

POWER LOCKING DOOR HANDLE WITH CAPACITIVE SENSING

FIELD OF THE INVENTION

This invention is directed towards handles for passenger doors, particularly for heavy duty vehicles, such as in the agricultural industry, heavy truck industry, and off road vehicle industry.

BACKGROUND OF THE INVENTION

Various types of handles are well-known for use on different types of operator doors on agricultural and construction machinery, equipment, heavy trucks, and other vehicles. For example, pull handles and push button handles have mechanical structures for unlatching a latched door. Power lock handles are also known, wherein a motor is housed within the handle, with the motor being actuated to lock and unlock the door.

Keyless door locks are also well-known in the automotive industry. Such keyless systems include a key pad located on the outer door panel, on the door handle, or on the door frame. The key pad is operatively connected to the door lock. Passive keyless entry systems, known as PKE, utilize a key fob which automatically unlocks the door when the fob comes within range of a sensor in the door or in the door handle.

Pressure-sensitive capacitive detection devices are also used in the automotive industry for unlocking the vehicle door. Such touch sensors or button systems employ a capacitive sensor in the pull handle grip to open the door in response to physical pressure on mechanical contact switches. Other proximity capacitive sensors are also used in the automotive industry to detect the presence of the operator's hand, without physical contact of the operator's hand on the door handle. These systems rely on a change in the dielectric environment of an electrode in the door handle grip.

Automotive vehicles using these various types of keyless entry systems, place the systems in the door panel, on the door frame, or in the pull handle grip, as opposed to the handle base mounted in the door panel. An integrated door handle having a keyless entry device is preferable from a manufacturing standpoint, as compared to keyless entry components placed in the door panel or door frame. However, the prior art door handles which place the keyless entry components in the hand grip require the grip to be made of two or more pieces to house the components therein. Such multi-piece construction reduces strength of the hand grip and requires the internal electronic components to be sealed from the weather. Also, power must be provided to the hand grip in order for the keyless entry electronic components to function. Thus, wires must be run through the pivotal pull handle, which provides limited options for location of the power supply wires.

Also, in the automotive industry, door handles are designed for aerodynamics. Accordingly, the door handle assembly typically includes a pan or well recessed into the outer door panel, which provide room for the operator's fingers to reach beneath the handle grip, with the hand grip being substantially flush with the outer door panel. Such low profile and aerodynamic construction further complicates the positioning of the door handle components, such as the power lock motor, wiring, and the like.

In the heavy duty vehicle and equipment industries, aerodynamics are less of a concern, such that recessed door handles are not necessary. But, there is a need in the heavy duty vehicle industry for improved power locking door handles, without the limitations required by the automotive industry.

Accordingly, a primary objective of the present invention is a provision of a door handle for heavy duty vehicles having a capacitive sensing element integrated into the handle base and associated with control elements to allow passive keyless entry by the vehicle operator.

Another objective of the present invention is the provision of a smart door handle for the heavy duty vehicle industry having a power lock actuated by a capacitive sensor in the stationery handle base.

Further objective of the present invention is the provision of a power locking pull or push button handle for the heavy duty vehicle industry with a strengthened one-piece hand grip.

Yet another objective of the present invention is a provision of a power locking door handle for the heavy duty vehicle industry with electronic components in the base for simplified manufacturing.

Still another objective of the present invention is the provision of a power locking door handle for the heavy duty vehicle industry having a capacitive sensing element that consumes minimal power.

Another objective of the present invention is a provision of a door handle for the heavy duty vehicle industry which integrates an antenna into the handle base to detect and authenticate presence of a user fob.

Yet another objective of the present invention is a provision of a door handle for heavy duty vehicles having a printed circuit board mounted in the stationary handle base.

A further objective of the present invention is a provision of a stand-alone, fully contained pull handle with integrated power lock motor, capacitive sensor and on-board electronics, for a fully functional, self-contained exterior modular product.

These and other objectives will become apparent from the following description of the invention.

SUMMARY OF THE INVENTION

A door handle is provided for a heavy duty vehicle and includes a base mounted on the exterior surface of the door panel. A hand grip is mounted on the base, and may be a pull type grip or a push button type grip. The hand grip generally has a one piece or solid construction for enhanced strength. A power lock motor is mounted in the base and is operatively connected to the door handle so as to lock and unlock the handle. A printed circuit board (PCB) is also mounted in the base. The PCB includes a capacitive sensor to sense the presence of an operator's hand in the open area or field between the hand grip and base, via the dielectric environmental change created by the operator's hand. The PCB then searches for a user fob, and if present, authenticates the fob. Then the PCB sends a signal to the lock motor to unlock the door latch. The base is sealed to protect the internal components from the weather. The PCB may be potted for resistance to shock and vibration, and for enhanced protection from moisture, dust, and the like.

DETAILED DESCRIPTION OF THE DRAWING

Figure 10:
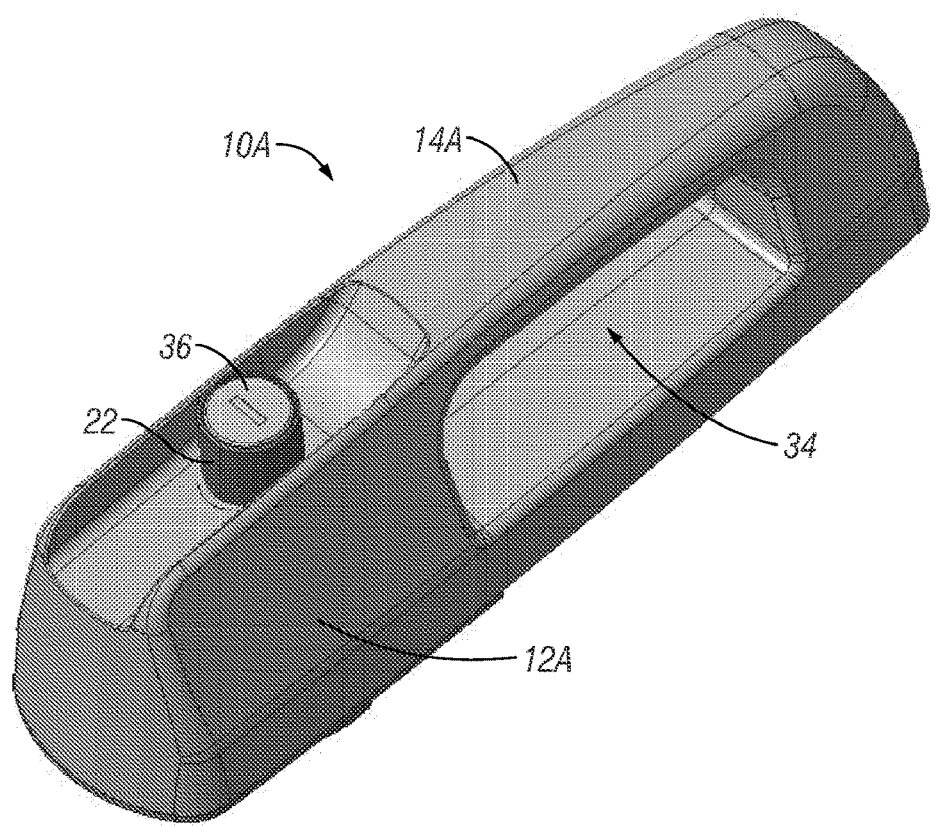
FIG. 10 is a perspective view of an alternative embodiment of the heavy duty vehicle handle, according to the present invention.

A door handle assembly according to the present invention is generally designated by the reference numeral 10 in FIGS. 1-9. An alternative embodiment of the handle assembly is designated by the reference numeral 10A in FIG. 10. Handle assembly 10 is a pull-type handle, while handle assembly 10A is a push button-type handle. The handle assembly 10, 10A is designed to be surface mounted on a door panel, and is particularly intended for use on heavy duty vehicles, such as in the agricultural industry, construction industry, heavy truck industry, and other vehicles.

Figure 1:
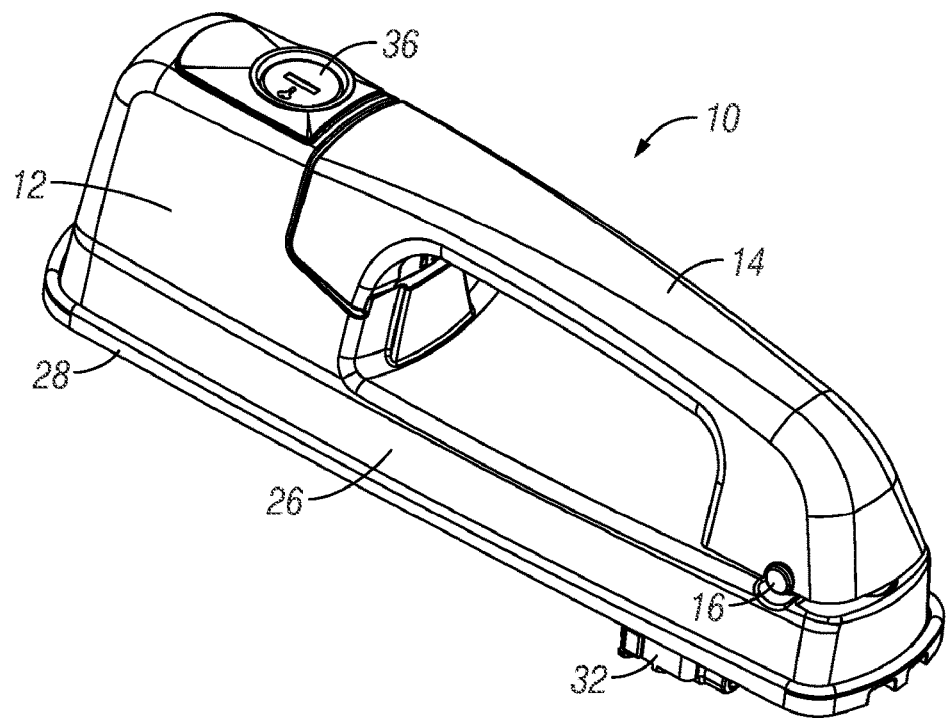
FIG. 1 is a perspective view of one embodiment of the heavy duty vehicle door handle, according to the present invention.
Figure 2:
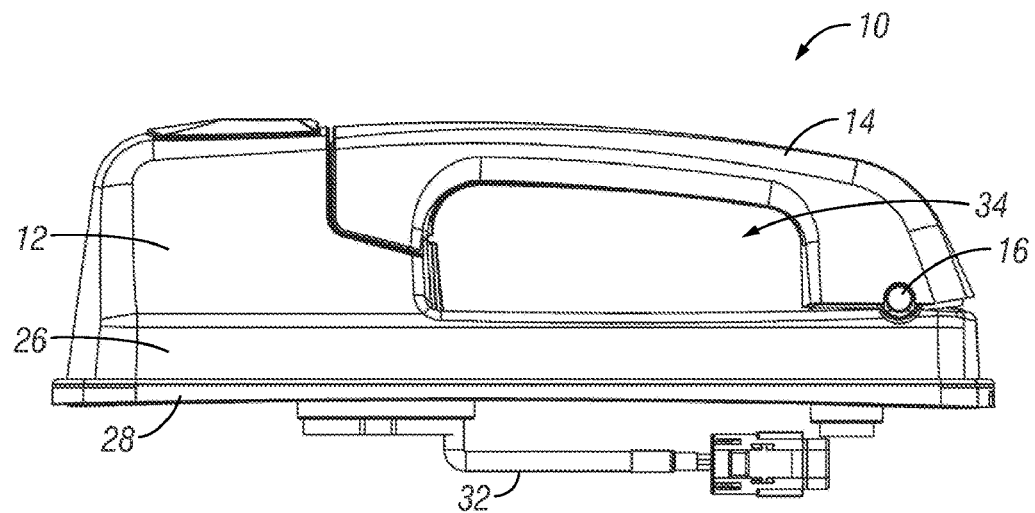
FIG. 2 is a side elevation view of the handle shown in FIG. 1.
Figure 3:
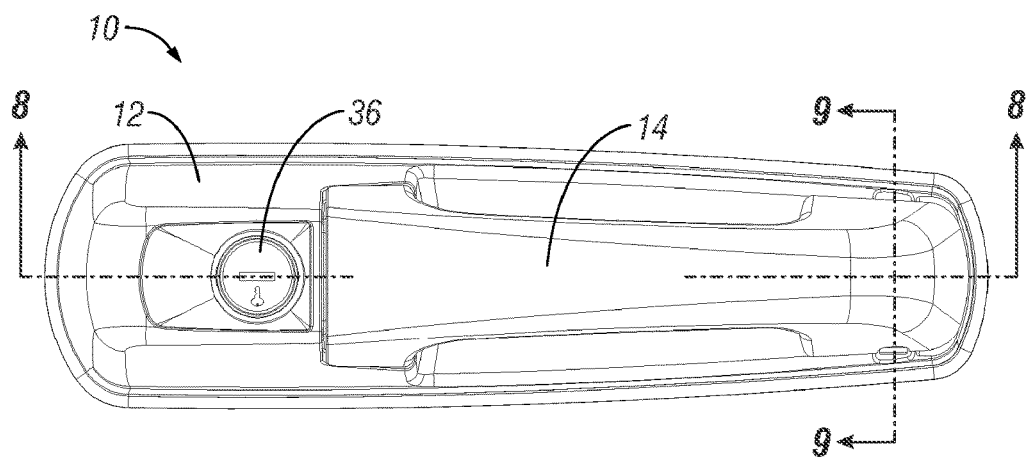
FIG. 3 is a top plan view of the handle shown in FIG. 1.
Figure 4:
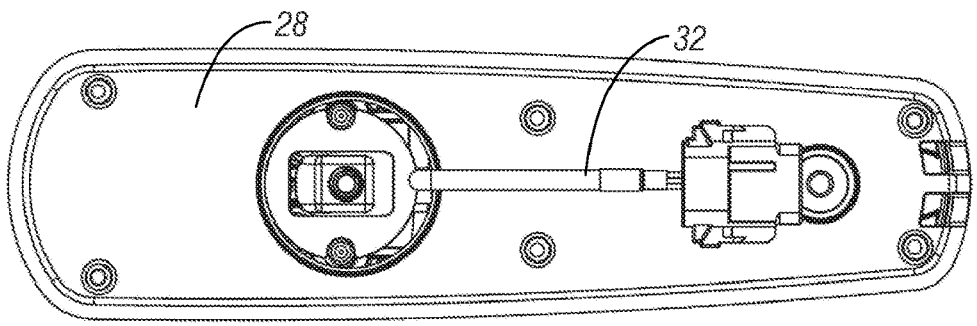
FIG. 4 is a bottom plan view of the handle shown in FIG. 1.
Figure 5:
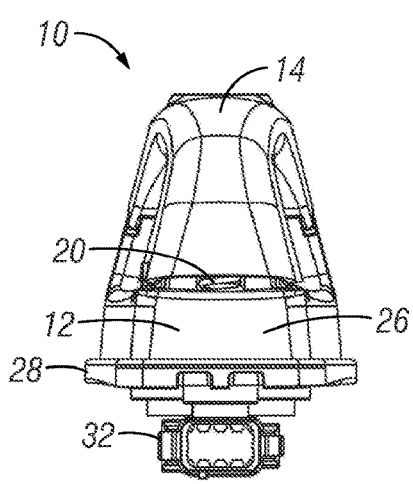
FIG. 5 is an elevation view from one end of the handle shown in FIG. 1.
Figure 6:
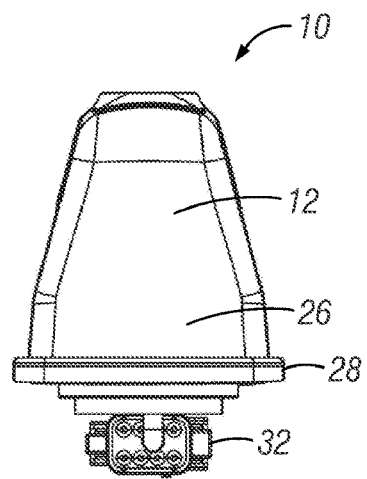
FIG. 6 is an elevation view from the opposite end of the handle.
Figure 7:
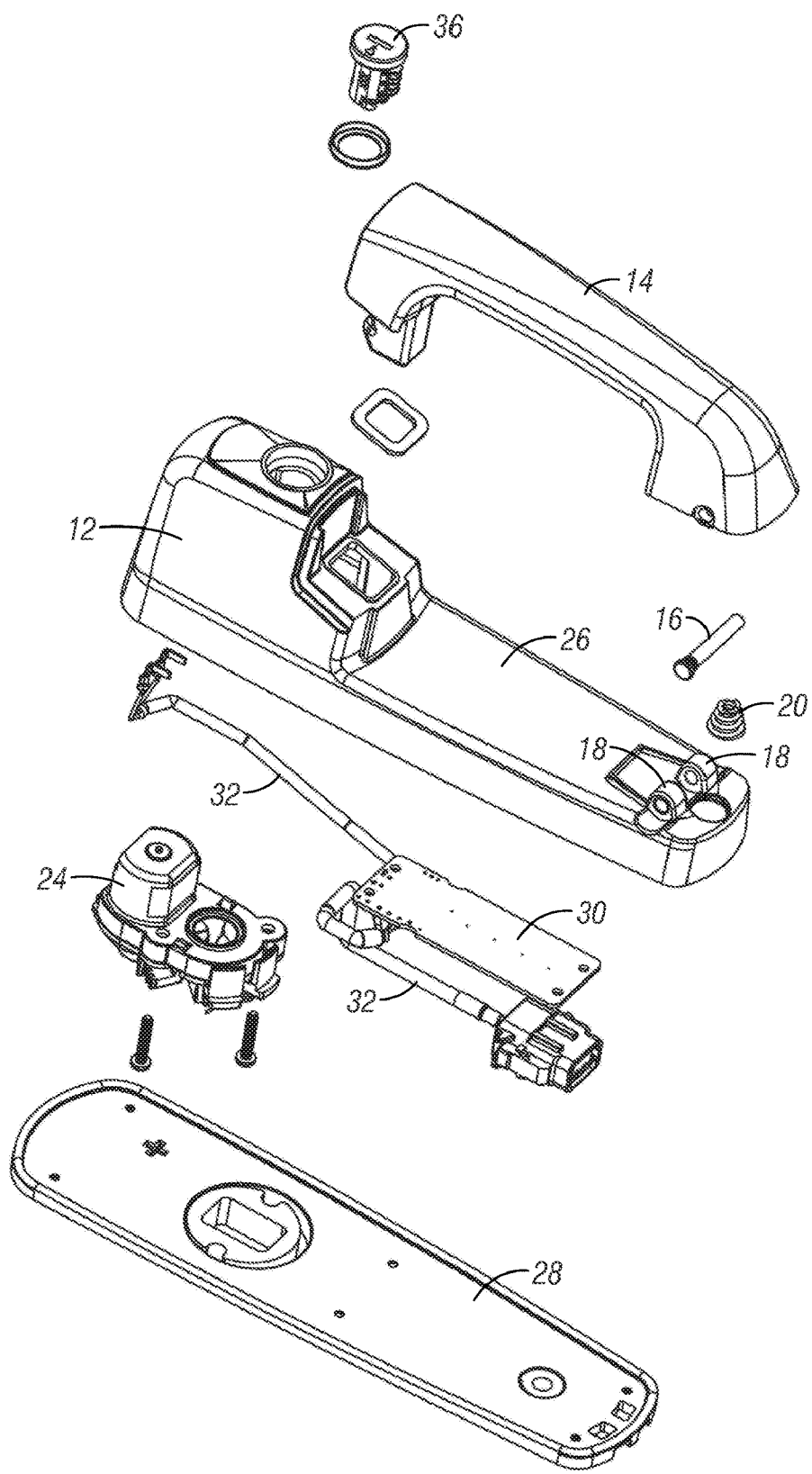
FIG. 7 is an exploded view of the components of the handle shown in FIG. 1.
Figure 8:
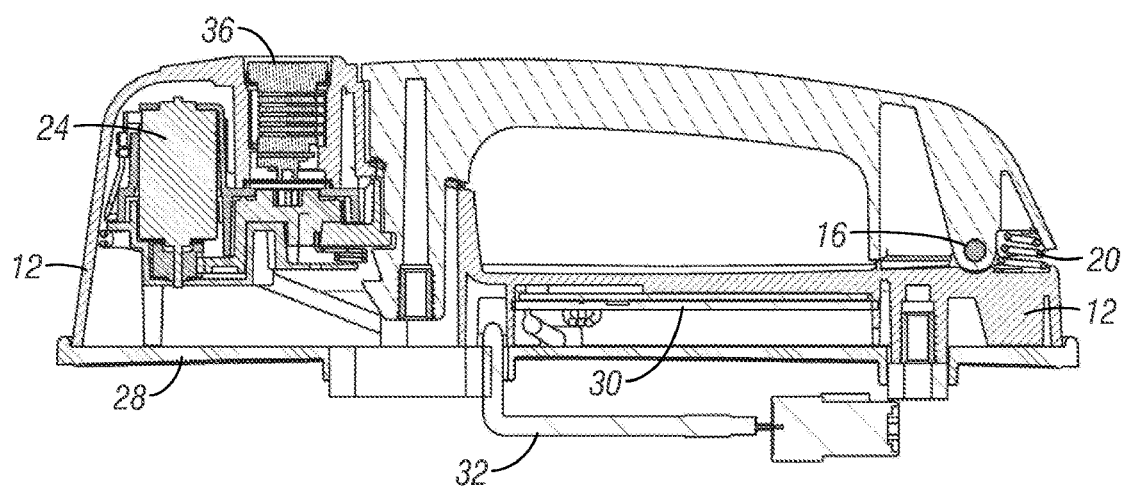
FIG. 8 is a sectional view taken along the lines 8-8 of FIG. 3.
Figure 9:
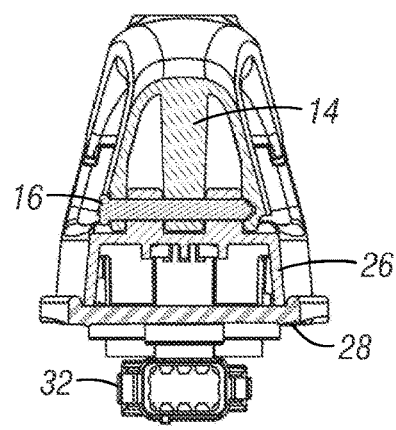
FIG. 9 is a sectional view taken along the lines 9-9 of FIG. 3.

The handle assembly 10 includes a base 12, and a pull-type hand grip 14 pivotally mounted to the base 12. The hand grip 14 pivots about the axis of a pin 16 extending through ears 18 on the base 12 and through the hand grip 14. A spring resides between the base 12 and the hand grip 14, as seen in FIGS. 7 and 8, to normally bias the hand grip 14 to the closed, at-rest position. The hand grip 14 is operatively connected to the door latch (not shown), such that when the hand grip 14 is pulled by an operator or user, the door latch is unlatched.

In the push button hand assembly 10A, the hand grip 14A is integrally formed with the base 12A so that the base and hand grip are formed as one piece. A push button 22 is operatively connected to the door latch, such that when the button 22 is depressed by a user or operator, the latch is unlatched.

Both handle assemblies 10, 10A have a power locking function. A power lock motor 24 is housed within the base 12, 12A, as best shown in FIGS. 7 and 8. More particularly, the base 12, 12A includes an upper housing 26 and a lower back plate or gasket 28. The housing 26 and gasket 28 are connected by screws, or any other convenient means, so as to provide a weather-proof seal.

The operation of the power lock motor is described in Applicant's U.S. Pat. No. 7,819,440, which is incorporated herein by reference in its entirety. Applicant's U.S. Pat. No. 9,441,403 is also incorporated by reference in its entirety, including its description of a keypad and PCB.

The motor 24 is hard wired or otherwise operatively connected to a PCB 30, which includes a PKE control module, and to a power source (not shown), such as a battery for the vehicle, machinery, or equipment. A wire harness 32 electrically couples the PCB 30 the vehicles network (LIN, CAN or other network communication protocol). The wire harness 32 provides power, ground, and a wake-up signal to the vehicle network, as described below.

The PCB 30 includes a capacitive sensor for detecting when a user or operator inserts their hand into the opened field or space between the hand grip 14, 14A and the base 12, 12A. The user's hand changes the environmental condition, such that the PCB 30 will send a wake-up signal, after recognizing a user's fob, to the power lock motor 24, which in turn unlocks the door latch. The handle assembly 10, 10A is normally in a sleep mode to minimize power consumption. When a user or operator wants to open the door, a change in the dielectric conditions resulting from the user reaching into the handle space 34 or gripping the hand grip 14, 14A, generates a signal from the capacitive sensor to the PKE Control module (not shown) which actuates the motor 24, and actuates the motor 24 to allow the door to be opened. Thus, the capacitive sensor wake up signal goes to the PKE controller, then the controller looks for and authenticates or validates of a user fob, and then sends a signal to the motor to unlock the door latch.

The handle assembly 10, 10A may also include a second capacitive sensor on the PCB to prevent false signals from actuating the motor 24. For example, rain or snow can potentially change the environmental condition sufficiently to actuate the first capacitive sensor. However, in such a situation, the door would not unlock because the PKE fob is not present, but will drain the battery as the handle assembly repeatedly wakes up from the false signal generated by the rain or snow. The second capacitive sensor functions like a comparator and is oriented perpendicular to the first capacitive sensor. The second capacitive sensor evaluates the environment and allows the system to differentiate between a passive environmental change caused by the weather and a dynamic change caused by the operator inserting their hand into the open space 34 of the handle assembly 10, 10A. Thus, during wet weather, both capacitive sensors see similar electrical changes, and cancel out one another, such that the system is not woken from the sleep mode. Only when the operator inserts their hand into the space 34 will the system wake up due to the dynamic change sensed by the first capacitive sensor.

A key lock cylinder 36 is provided on each handle assembly 10, 10A. The key lock cylinder 36 is a secondary back-up option to allow a person to override the power lock system in the event of a dead battery or non-functioning fob. The lock cylinder 36 resides in a recess in the base 12, 12A, and preferably has a cap to prevent moisture from getting into the base 12, 12A.

The PKE control module also provides for multiplexing communication with other features and functions of the vehicle through a CAN, LIN, or other electronic communication system, so that telematic functions can be achieved. The PKE control module can also interface with the vehicle to obtain various functions, such as keyless ignition and immobilization, operator recognition through the use of an ID unique to each person or user as recognized by a CPU, an audit trail, and control of other vehicles systems and features, such as lighting, hydraulics, and the like. A keypad can also be provided to input operator recognition, such as an identification code, to allow or enable the telematics system to interface with and/or control vehicle function and vehicle health. See Applicant's application 62/467,610 filed on Mar. 6, 2017 and entitled An Improved Base Control Module For Automotive Vehicles, which is incorporated herein by reference.

Preferably, the PCB 30 is potted to minimize potential adverse effects from vibrations, such as when the vehicle is driven. Also, the base 12, 12A of the handle assembly 10, 10A may include multiple PCBs or interchangeable, modular PCBs, which would allow modification of the handle functionality. Additional user interfaces or features can also be added, such as blue tooth, NFC, and the like.

An antenna may also be provided on the PCB, or otherwise incorporated into the base 12, 12A to detect and authenticate a user fob. Authentication can be achieved via interaction of 125 KHz data exchange with unique serial numbers that can be interpreted by the vehicle system for proper authentication. The user authentication system can also allow passive PKE and other functions predefined or predetermined by the vehicle system designer.

The capacitive sensor may also have the ability to recognize movement of the user's hand, such as a swipe up or swipe down gesture, which allows the handle assembly to perform additional functions.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An exterior handle assembly for a vehicle door, comprising:
    a base adapted to be surface mounted on the door;
    a hand grip connected to the base and with an open field between the base and the hand grip to receive an operator's hand;
    a power lock motor in the base;
    a printed circuit board in the base to provide system controls for the handle assembly, with the system controls normally being in a sleep mode when an operator is not at the vehicle;
    a first capacitive sensor on the printed circuit board and adapted to recognize a user's fob and to wake up the system controls when an operator's hand enters the open field;
    a second capacitive sensor on the printed circuit board to cooperate with the first capacitive sensor to prevent actuation of the power lock motor in response to weather induced capacitive changes in the open field; and
    the printed circuit board adapted to send an unlock signed to the power lock motor after recognizing a user fob.

2. The exterior handle assembly of claim 1 wherein the capacitive sensor is on the printed circuit board.

3. The exterior handle assembly of claim 1 further comprises a key lock cylinder in the handle to mechanically override the power lock motor.

4. The exterior handle assembly of claim 1 wherein the handle is a pull type handle.

5. The exterior handle assembly of claim 1 wherein the handle is a push button type handle.

6. The exterior handle assembly of claim 1 further comprising an antenna in the base to receive an input signal from a key fob actuated by the operator.

7. The exterior handle assembly of claim 6 wherein the input signal is a serial number.

8. The exterior handle assembly of claim 6 wherein the input signal is sent via 125 KHz.

9. The exterior handle assembly of claim 6 wherein the input signal moves the power lock motor to an unlock position to allow the handle to be actuated to open the vehicle door.

10. The exterior handle assembly of claim 1 wherein the printed circuit board includes passive keyless entry controls.

11. The exterior handle assembly of claim 1 wherein the capacitive sensor is potted.

12. The exterior handle assembly of claim 1 further comprising an antenna in the base to authenticate the user fob.

13. A handle assembly for the exterior of a vehicle passenger door, comprising:
    a base having an internal PCB with a $1^{st}$ capacitive sensor and an internal power lock assembly to lock and unlock the door:
    a handle mounted on the base to open the door;
    the first capacitive sensor to sense presence of an operator's fob and to wake up a control system when an operators' hand enters a space between the base and the handle, and then actuating the power lock assembly to unlock a door latch associated with the door; and
    a second capacitive sensor on the PCB to prevent actuation of the power lock assembly absent an operator's hand adjacent the handle.

14. The handle assembly of claim 13 wherein the handle pulls outwardly to open the door.

15. The handle assembly of claim 13 wherein the handle has a push button to open the door.

16. The handle assembly of claim 13 wherein the PCB includes PKE controls.

17. The handle assembly of claim 13 further comprising a power source for the PCB.

18. The handle assembly of claim 17 further comprising a key lock cylinder on the handle to unlock the door when the power source is disabled.

* * * * *